(No Model.) 3 Sheets—Sheet 1.
W. F. WELLMAN.
ROAD SCRAPING MACHINE.
No. 381,867. Patented Apr. 24, 1888.
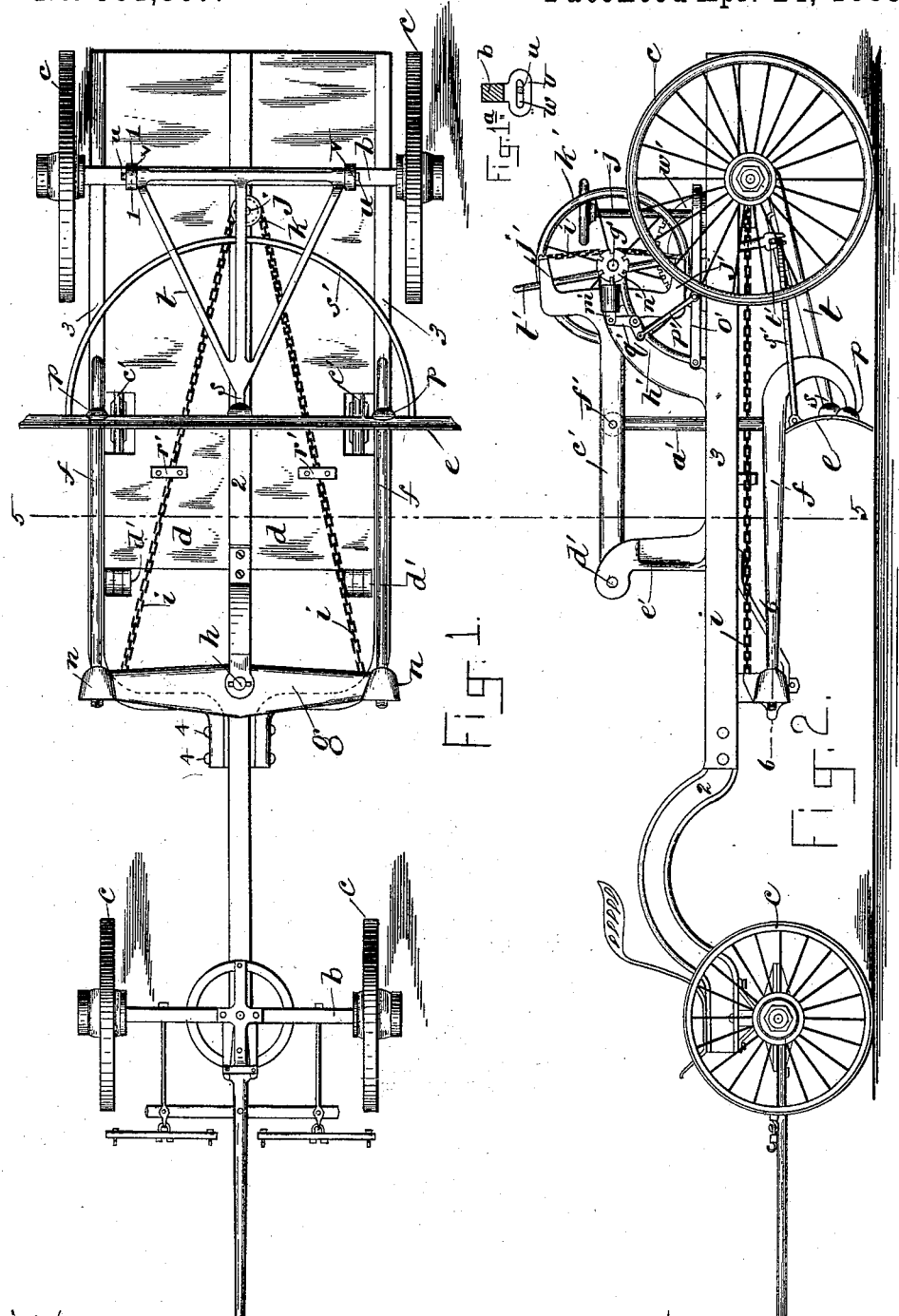
WITNESSES.
W. E. Ramsay.
J. E. Smith.
INVENTOR.
W. F. Wellman.
Wright Brown & Corsley.
Attys.

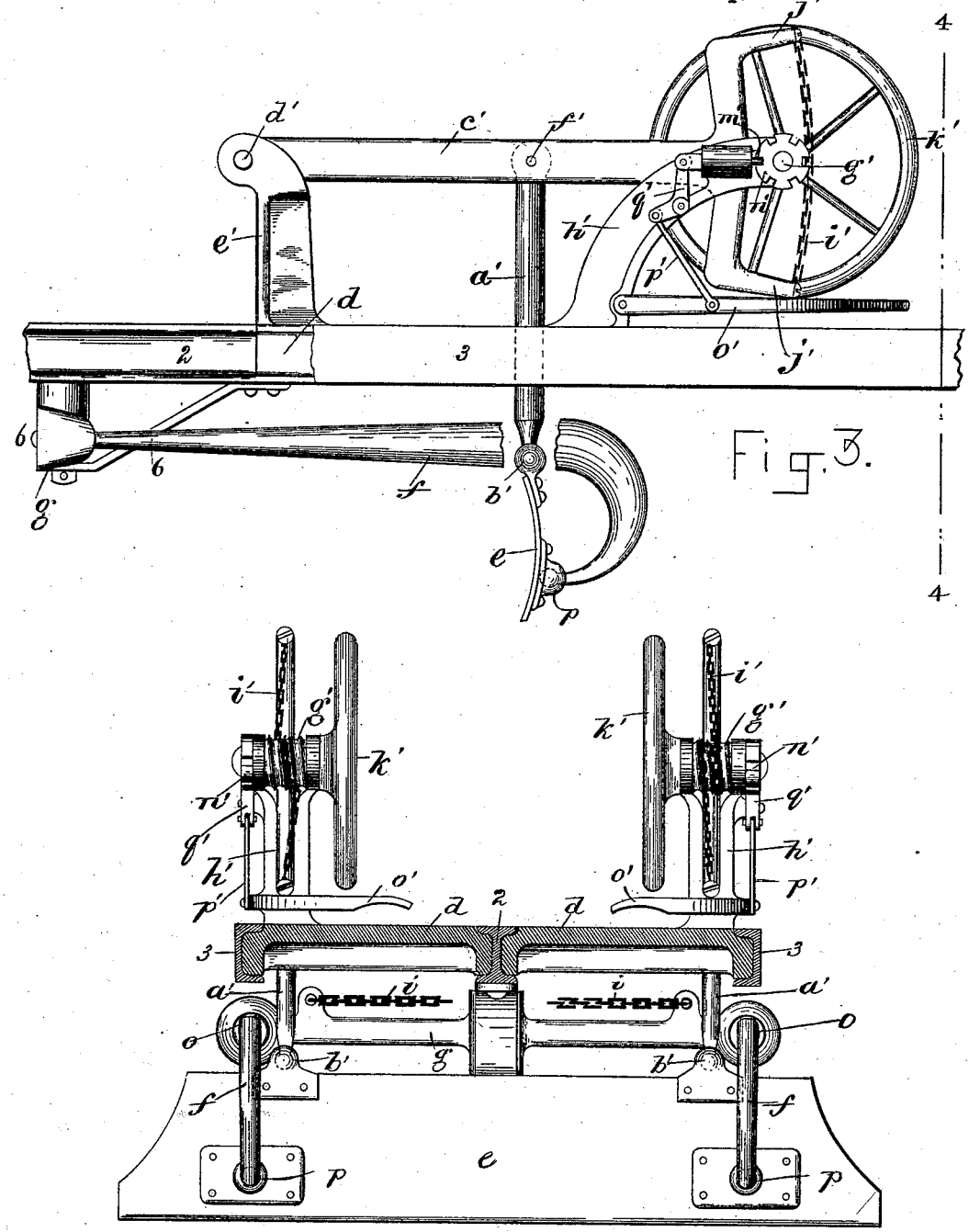

(No Model.) 3 Sheets—Sheet 3.
W. F. WELLMAN.
ROAD SCRAPING MACHINE.
No. 381,867. Patented Apr. 24, 1888.
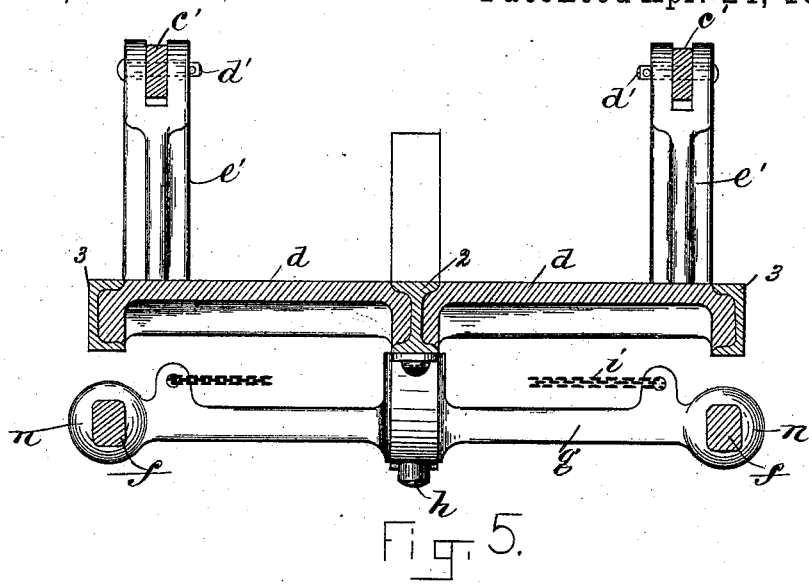
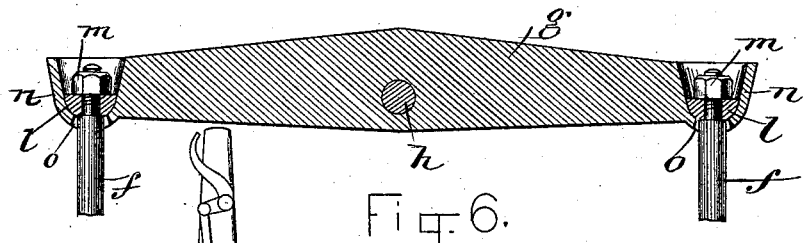
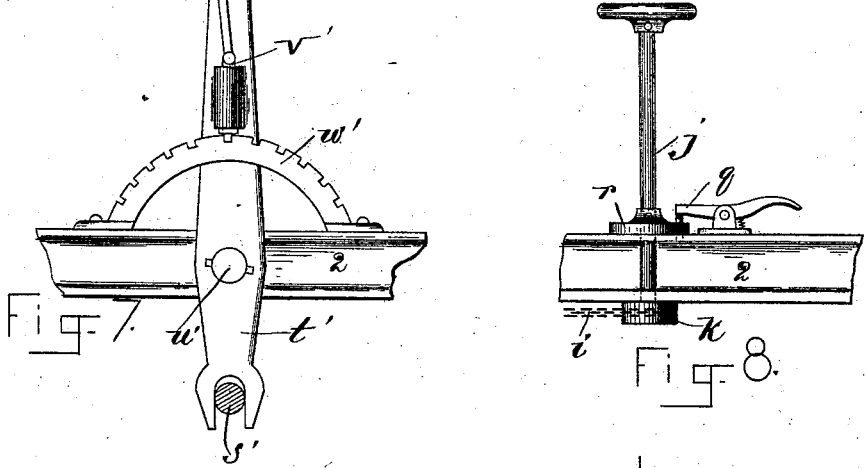
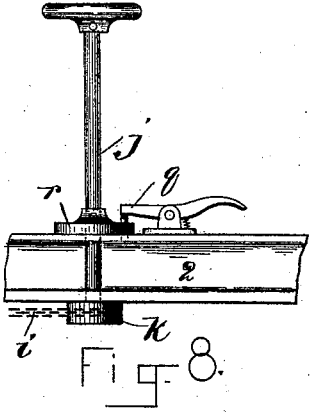
WITNESSES:
W. B. Ramsay.
J. E. Smith.
INVENTOR:
W. F. Wellman.
by Wight, Brown & Crosley,
Attys.
N. PETERS, Photo-Lithographer, Washington, D. C.

UNITED STATES PATENT OFFICE.

WILLARD FRANK WELLMAN, OF BOSTON, MASSACHUSETTS, ASSIGNOR TO CHARLES H. DUNHAM, OF SAME PLACE, AND FRED H. HONDLETTE, OF WALTHAM, MASSACHUSETTS.

ROAD-SCRAPING MACHINE.

SPECIFICATION forming part of Letters Patent No. 381,867, dated April 24, 1888.

Application filed November 11, 1887. Serial No. 254,877. (No model.)

*To all whom it may concern:*

Be it known that I, WILLARD FRANK WELLMAN, of Boston, in the county of Suffolk and State of Massachusetts, have invented certain new and useful Improvements in Road-Scraping Machines, of which the following is a specification.

This invention consists in certain improvements in road-scraping machines, hereinafter described and claimed, whereby greater efficiency, strength, and durability are attained than in machines of previous construction.

Of the accompanying drawings, forming a part of this specification, Figure 1 represents a bottom plan view of my improved road-scraping machine. Fig. 2 represents a side view of the same. Fig. 1ª represents a section on line 1 1, Fig. 1. Fig. 3 represents an enlarged side view of a portion of the machine. Fig. 4 represents a section on line 4 4, Fig. 3. Fig. 5 represents a section on line 5 5, Figs. 1 and 2. Fig. 6 represents a section on line 6 6, Figs. 2 and 3. Figs. 7 and 8 represent detail views.

The same letters of reference indicate the same parts in all the figures.

In carrying out my invention I construct a strong and rigid frame to support the working parts, hereinafter described, and mount the same on axles $b$ $b$, having wheels $c$. Said frame may be constructed in any suitable manner to support and permit the reciprocating movement of two slides, $d$ $d$, which support the devices whereby the various adjustments are imparted to the scraper $e$, as hereinafter described. The frame is here shown as composed of a central beam, 2, extending longitudinally of the machine, and two side beams, 3 3, secured to the bar 2 by bolts 4 4 at their forward ends, and bent outwardly therefrom and extended backwardly parallel therewith, as shown in Fig. 1. The beams 2 3 3 are rigidly attached to the rear axle, and the forward end of the central beam has a suitable pivotal connection with the forward axle. The central beam is I-shaped in cross-section, and the side beams are channeled in their inner sides, as shown in Fig. 4.

$e$ represents the scraper, which is preferably of concavo-convex shape in vertical section, and is hung below the supporting-frame so as to extend crosswise thereof, as shown in Fig. 1. The scraper is connected by draw-bars $f$ $f$ with a transverse lever, $g$, which is pivoted at $h$ to the supporting-frame, and is adapted to be swung horizontally on its pivot by means of a chain, $i$, connected to it near its ends, and a vertical shaft, $j$, journaled in the central beam of the supporting-frame, said shaft having a wheel, $k$, formed by means of sprocket-teeth, or in any other suitable way, to engage the chain, so that the rotation of the shaft $j$ by a person standing on the supporting-frame will cause the chain to move and turn the lever $g$. The draw-bars $f$ $f$ have hemispherical washers $l$, secured by nuts $m$ to their forward ends, Fig. 6, and the lever $g$ has sockets $n$ $n$ formed to receive said washers and permit them to turn freely in any direction, the draw-bars passing through enlarged orifices $o$ $o$ in said sockets. The draw-bars are therefore connected with the lever $g$ by ball-and-socket joints, which permit the free horizontal swinging movements of the lever. The rear ends of the draw-bars are curved downwardly and terminate in rounded ends or balls, which are received in sockets $p$, attached to the rear sides of the scraper, near the lower edge of the latter.

It will be seen that the scraper is drawn along by the draw-bars from the lever $g$, and that the jointed connection of the draw-bars to the lever and to the scraper enables the scraper and lever to freely turn together, so that when the lever is turned horizontally in either direction the scraper will be correspondingly turned, and may therefore be adjusted at right angles with the supporting-frame, or at any other desired angle, and with either end forward, so as to move the earth, gravel, &c., laterally in either direction.

The lever $g$ and scraper $e$ are secured at any angle to which they may be adjusted by latch $q$, which is pivoted to ears on the supporting-frame and engages orifices in a disk, $r$, Fig. 8, attached to the shaft $j$.

The scraper is prevented from being displaced laterally by a fulcrum, $s$, on which it turns. Said fulcrum, which is in line with the pivot $h$ of the lever $g$, is formed on a triangular frame, $t$, having trunnions $u$ $u$, which are mounted in bearings $v$ $v$ on the rear axle, $b$, so that the fulcrum $s$ is capable of vertical movement. The bearings $v\ v$ have slots $w$, Fig. 1ª, in which the trunnions $u$ can move to give the frame $t$ and fulcrum $s$ a forward-and-back movement, which is necessary in order that the upper edge of the scraper may be moved forward or back to vary the vertical inclination of the scraper, as will be presently described.

Devices are provided whereby the scraper may be raised at either end to give it a longitudinal inclination in either direction or at both ends to entirely raise it from the ground. Said devices, as here shown, are composed of two vertical rods, $a'\ a'$, connected by ball-and-socket joints at $b'$ with the scraper, levers $c'\ c'$, pivoted at $d'$ to standards $e'$ on the slides $d\ d$ and at $f'$ to the rods $a'$, shafts $g'\ g'$, journaled in standards $h'\ h'$ on said slides, and chains $i'\ i'$, engaged with said shafts and secured at their ends to arms $j'\ j'$, formed on the levers $c'$.

When the shafts $g'\ g'$ are rotated by means of hand-wheels $k'$ thereon, the chains $i'$ will be moved upwardly or downwardly, as the case may be, and will therefore raise or lower the levers $c'$ and the scraper connected by the rods $a'$ with said levers. It will be seen that the shafts $g'$ are independent of each other, so that either lever and the corresponding end of the scraper can be raised and lowered independently. The shafts may be locked to hold the scraper, or either end thereof, elevated by means of locking-dogs $m'$, adapted to slide in guides on the standards $h'$. Said dogs are thrown by springs into engagement with notched disks $n'$, affixed to the shafts $g'$, and may be disengaged from said disks by the depression of foot-levers $o'$, connected with said dogs by rods $p'$ and bell-crank levers $q'$, Figs. 2, 3, and 4.

The standards $e'$ and $h'$, supporting the scraper-elevating devices, are, as before stated, mounted on the slides $d\ d$. Said slides are attached at $r'\ r'$, Fig. 1, to the chain $i$, which swings the lever $g$ and scraper $e$ horizontally, so that said slides are moved by the chain with the lever and scraper, the scraper-lifting devices being thus kept in operative relation to the scraper, whether the latter be at a right angle with the frame of the machine, as shown, or at any other angle.

To enable the upper edge of the scraper to be thrown forward or backward to vary the angle of the front of the scraper with relation to the ground, I pivot to the rear side of the scraper, near its upper edge, the ends of a curved rod or bail, $s'$, the central portion of which passes through a slot in the lower end of a lever, $t'$, which is pivoted at $u'$, Fig. 7, to central beam, 2, of the supporting-frame. When the operator desires to throw forward the upper edge of the scraper, he moves back the upper end of the lever $t'$, the lower end of said lever acting on the bail $s'$ and throwing the same forward. When the upper edge of the scraper is to be moved backward, the operator moves the upper end of the lever $t'$ forward. The lever $t'$ may be locked to hold the scraper at any desired inclination by a spring-bolt, $v'$, engaging with a notched segment-bar, $w'$, affixed to the supporting-frame.

From the foregoing it will be seen that the scraper is fully under control, and may be placed horizontally at any desired angle with the frame of the machine, and may be raised at either or both ends, and may be tipped forward or backward while in any of the positions in which it may be placed.

I do not claim, broadly, the combination of a supporting frame or carriage, a scraper below the same, and means for swinging the scraper horizontally and for raising and lowering it at either or both ends, as I am aware that such combination is not new in a broad sense.

I claim—

1. In a road-scraping machine, the combination of a supporting-frame mounted on wheels, a fulcrum supported by said frame and adapted to swing in a vertical plane, but not laterally, a scraper having a universal-joint connection with said fulcrum, a lever pivoted to the frame in advance of the scraper, draw-bars jointed to the scraper and lever, means for turning the lever and scraper horizontally to vary the angle of the scraper with the direction of its movement, and means for holding the scraper at any angle to which it may be so adjusted.

2. In a road-scraping machine, the combination of a supporting-frame mounted on wheels, a fulcrum supported by said frame and adapted to swing in a vertical plane, but not laterally, a scraper having a universal-joint connection with said fulcrum, draw-bars connecting the scraper with a lever on the frame in advance of the scraper and jointed to the scraper and lever, and independent mechanisms supported by the frame, whereby either end of the scraper may be raised independently, and means to incline the scraper from end to end, and means for holding the scraper at any inclination to which it may be adjusted, as set forth.

3. In a road-scraping machine, the combination of a supporting-frame mounted on wheels, a fulcrum supported by said frame and adapted to swing in a vertical plane, but not laterally, a scraper having a universal-joint connection with said fulcrum, draw-bars connecting the scraper with a lever on the frame in advance of the scraper and jointed to the scraper and lever, and means for tipping the scraper forward or backward to vary the angle of its front surface with the ground, and means for holding the scraper at any angle to which it may be tipped, as set forth.

4. In a road-scraping machine, the combination of a wheeled supporting-frame, a lever, $g$, pivoted to said frame, a vertically-movable fulcrum connected to the frame in line longitudinally of the frame with the pivot of the lever $g$, a scraper engaged at its central portion with said fulcrum and adapted to turn in any direction thereon, draw-bars jointed to the scraper and to the lever $g$, means, substantially as described, for moving said lever on its pivot to turn the scraper horizontally on its fulcrum, and means, substantially as described, for elevating the scraper independently at either end, and thereby turning the scraper vertically on its fulcrum.

5. In a road-scraping machine, the combination of a wheeled supporting-frame, a lever, $g$, pivoted to said frame, a vertically-movable fulcrum connected to the frame in line longitudinally of the frame with the pivot of the lever $g$, a scraper engaged at its central portion with said fulcrum and adapted to turn in any direction thereon, draw-bars jointed to the scraper and to the lever $g$, means, substantially as described, for moving said lever on its pivot to turn the scraper horizontally on its fulcrum, means, substantially as described, for elevating the scraper independently at either end, and thereby turning the scraper vertically on its fulcrum, and means for tipping the scraper forward or backward, and thereby varying the inclination of the scraper.

6. In a road-scraping machine, the combination of the supporting-frame, the lever $g$, pivoted directly to said frame, means, substantially as described, for turning said lever on its pivot and for holding it in different positions, the scraper $e$, located behind said lever, the fulcrum for said scraper, and the draw-bars jointed to the ends of the lever, and having their rear ends curved downwardly to pass over the scraper and bear against the back thereof, and connected with the scraper by ball-and-socket joints, as set forth.

7. The combination of the supporting frame, the lever $g$, pivoted thereto, the scraper connected by draw-bars $ff$ with said lever, the slides $dd$, movable in guides on the supporting-frame, scraper raising and lowering devices supported by said slides, and means, substantially as described, whereby the lever and scraper may be swung horizontally to vary the angle of the scraper and the slides $dd$ at the same time moved to correspond with the movement of the scraper, as set forth.

8. The combination of the supporting-frame, the lever $g$, pivoted thereto, the scraper, the draw-bars connecting the scraper and lever, the slides $dd$, movable in guides in the supporting-frame, the levers $c'$ $c'$, pivoted to standards on said slides and connected with the scraper, devices, substantially as described, supported by said slides for raising and lowering said levers, the chain $i$, secured to the lever $g$ and to the slides $dd$, and the chain-operating shaft $j$, journaled in a fixed bearing in the supporting-frame, as set forth.

9. The combination of the supporting-frame, the scraper, the vertically-movable fulcrum $s$, means, substantially as described, for swinging said scraper horizontally, means, substantially as described, for adjusting the scraper vertically, the curved rod or bail $s'$, engaged with the scraper, and the lever $t'$, pivoted to the supporting-frame and engaged, as described, with said bail, whereby the scraper may be tipped forward or backward, as set forth.

10. In a road-scraping machine, the frame composed of the central I-beam connected with the front and rear axles and the channeled side beams secured at their rear ends to the rear axle and extending forward from said axle substantially parallel with the central beam, and bent inwardly at their forward ends and secured to the central beam, as set forth.

11. In a road-scraping machine, the frame composed of the central I-beam connected with the front and rear axles and the channeled side beams secured at their rear ends to the rear axle and extending forward from said axle substantially parallel with the central beam, and bent inwardly at their forward ends and secured to the central beam, combined with the lever $g$, pivoted to the frame, the slides $dd$, guided by the channels of the parallel portions of the frame-beams, the scraper $e$, the draw-bars connecting the scraper to the lever $g$, devices supported by the slides $dd$ for raising and lowering the scraper, and mechanism for simultaneously moving the lever $g$, slides $dd$, and scraper $e$ horizontally, as set forth.

In testimony whereof I have signed my name to this specification, in the presence of two subscribing witnesses, this 29th day of October, A. D. 1887.

WILLARD FRANK WELLMAN.

Witnesses:
C. F. BROWN,
WILLIAM C. RAMSAY.